(12) United States Patent
Jelic et al.

(10) Patent No.: US 8,206,633 B2
(45) Date of Patent: Jun. 26, 2012

(54) METHOD AND APPARATUS FOR FORMING SLATS FOR FABRIC IN COVERINGS FOR ARCHITECTURAL OPENINGS

(75) Inventors: Ralph G. Jelic, Boulder, CO (US); William L. Teter, Westminster, CO (US); Paul G. Swiszcz, Niwot, CO (US); Kevin M. Dann, Denver, CO (US); Steven J. Carroll, Aurora, CO (US); Thomas E. Sevcik, Fort Lupton, CO (US); Stephen T. Wisecup, Erie, CO (US); Michael J. Siebenaller, Broomfield, CO (US)

(73) Assignee: Hunter Douglas Inc., Pearl River, NY (US)

( * ) Notice: Subject to any disclaimer, the term of this patent is extended or adjusted under 35 U.S.C. 154(b) by 1393 days.

(21) Appl. No.: 11/459,529

(22) Filed: Jul. 24, 2006

(65) Prior Publication Data

US 2007/0023962 A1    Feb. 1, 2007

Related U.S. Application Data

(60) Provisional application No. 60/702,794, filed on Jul. 26, 2005.

(51) Int. Cl.
*B29C 55/18* (2006.01)
(52) U.S. Cl. ........ 264/280; 425/384; 425/169; 425/363; 425/40.1
(58) Field of Classification Search .......... 264/284–285, 264/292, 296, 280, 40.1; 425/384, 169, 363
See application file for complete search history.

(56) References Cited

U.S. PATENT DOCUMENTS

| | | | |
|---|---|---|---|
| RE22,311 E | 5/1943 | Roy | |
| 3,006,031 A | 10/1961 | Friedman | |
| 3,475,935 A * | 11/1969 | Kajiwara | 72/8.7 |
| 4,076,184 A * | 2/1978 | Morgan | 242/419.1 |
| 4,671,754 A * | 6/1987 | Okita et al. | 425/66 |
| 4,711,005 A * | 12/1987 | Chang | 29/24.5 |
| 4,840,832 A | 6/1989 | Weinle et al. | |
| 5,472,127 A * | 12/1995 | Ichii et al. | 226/44 |
| 5,721,177 A | 2/1998 | Frank | |
| 5,791,390 A | 8/1998 | Watanabe | |
| 5,793,174 A * | 8/1998 | Kovach et al. | 318/468 |
| 6,033,504 A | 3/2000 | Judkins | |
| 6,190,153 B1 * | 2/2001 | Tsuzukiyama et al. | 425/135 |
| 6,572,725 B2 | 6/2003 | Goodhue | |
| 2002/0001706 A1 | 1/2002 | Yamagata et al. | |

(Continued)

FOREIGN PATENT DOCUMENTS

GB        2 355 469 A        4/2001

(Continued)

*Primary Examiner* — Joseph Del Sole
*Assistant Examiner* — Nahida Sultana
(74) *Attorney, Agent, or Firm* — Dorsey & Whitney LLP

(57) ABSTRACT

A method and apparatus for forming a transversely curved or formed strip of material which can be cut to length for use in a fabric for coverings for architectural opening includes a supply role of a flexible fabric strip material that is sequentially passed through a heating chamber with an elongated upwardly convex extrusion across which the strip material is drawn and a cooling station before being wrapped on a take-up drum. The apparatus includes driven rollers about which the strip material passes and the strip material is exposed to tension detectors and controlled temperatures such that the strip material formed in the apparatus is uniform along its length.

22 Claims, 16 Drawing Sheets

U.S. PATENT DOCUMENTS

| | | |
|---|---|---|
| 2002/0043347 A1 | 4/2002 | Rupel |
| 2003/0119411 A1* | 6/2003 | Yamakawa et al. ............ 442/401 |
| 2003/0215633 A1 | 11/2003 | Morris et al. |
| 2004/0025315 A1* | 2/2004 | Lee ............................... 29/281.5 |
| 2005/0117707 A1* | 6/2005 | Baier et al. ..................... 378/156 |
| 2006/0027340 A1* | 2/2006 | Colson et al. ........... 160/168.1 R |
| 2008/0250872 A1* | 10/2008 | Lamprillo ................... 73/862.41 |
| 2011/0001264 A1* | 1/2011 | Minoura et al. ............... 264/293 |

FOREIGN PATENT DOCUMENTS

| | | |
|---|---|---|
| WO | WO 2005/062875 A2 | 7/2005 |
| WO | WO 2005/062875 A3 | 7/2005 |

\* cited by examiner

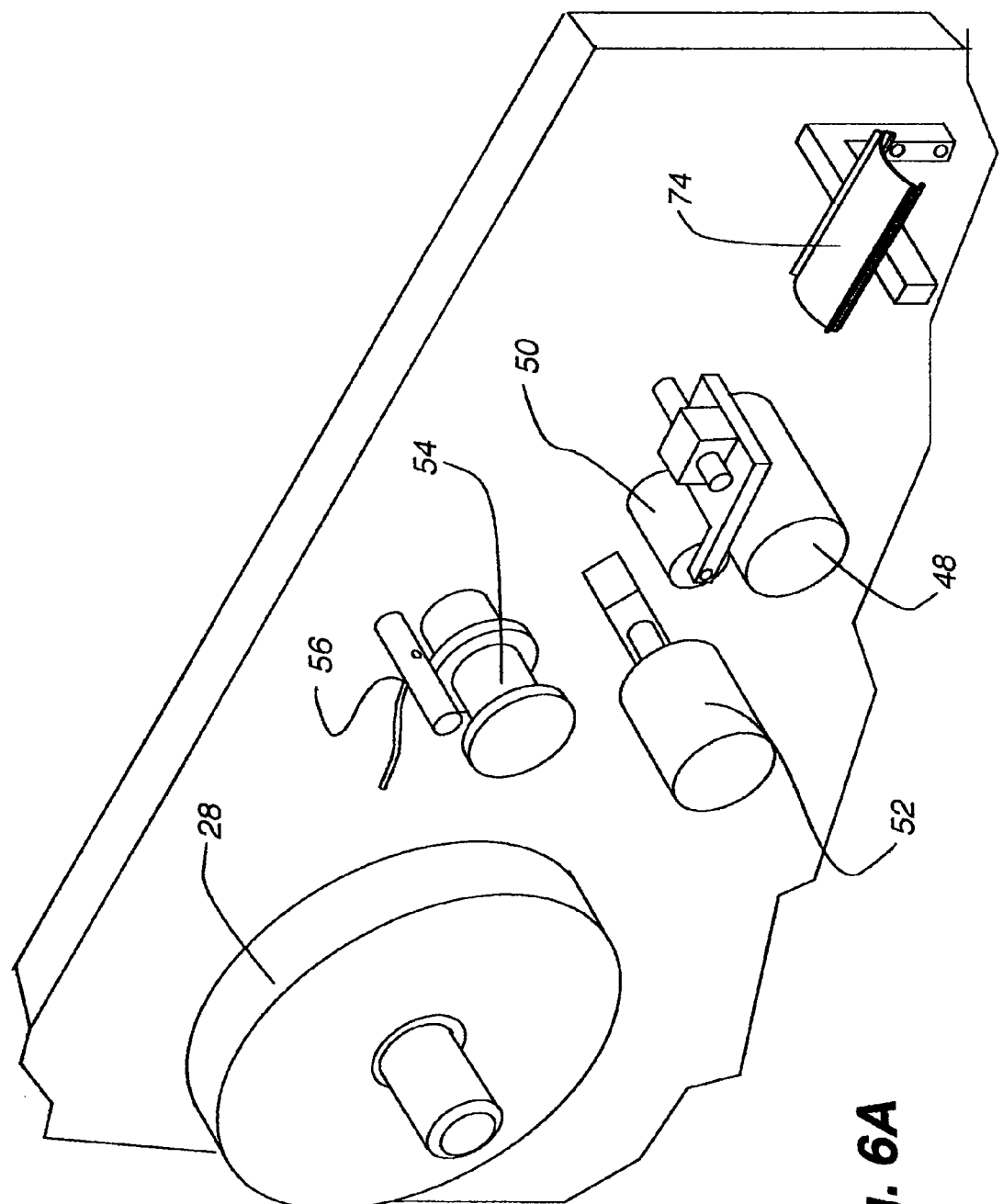

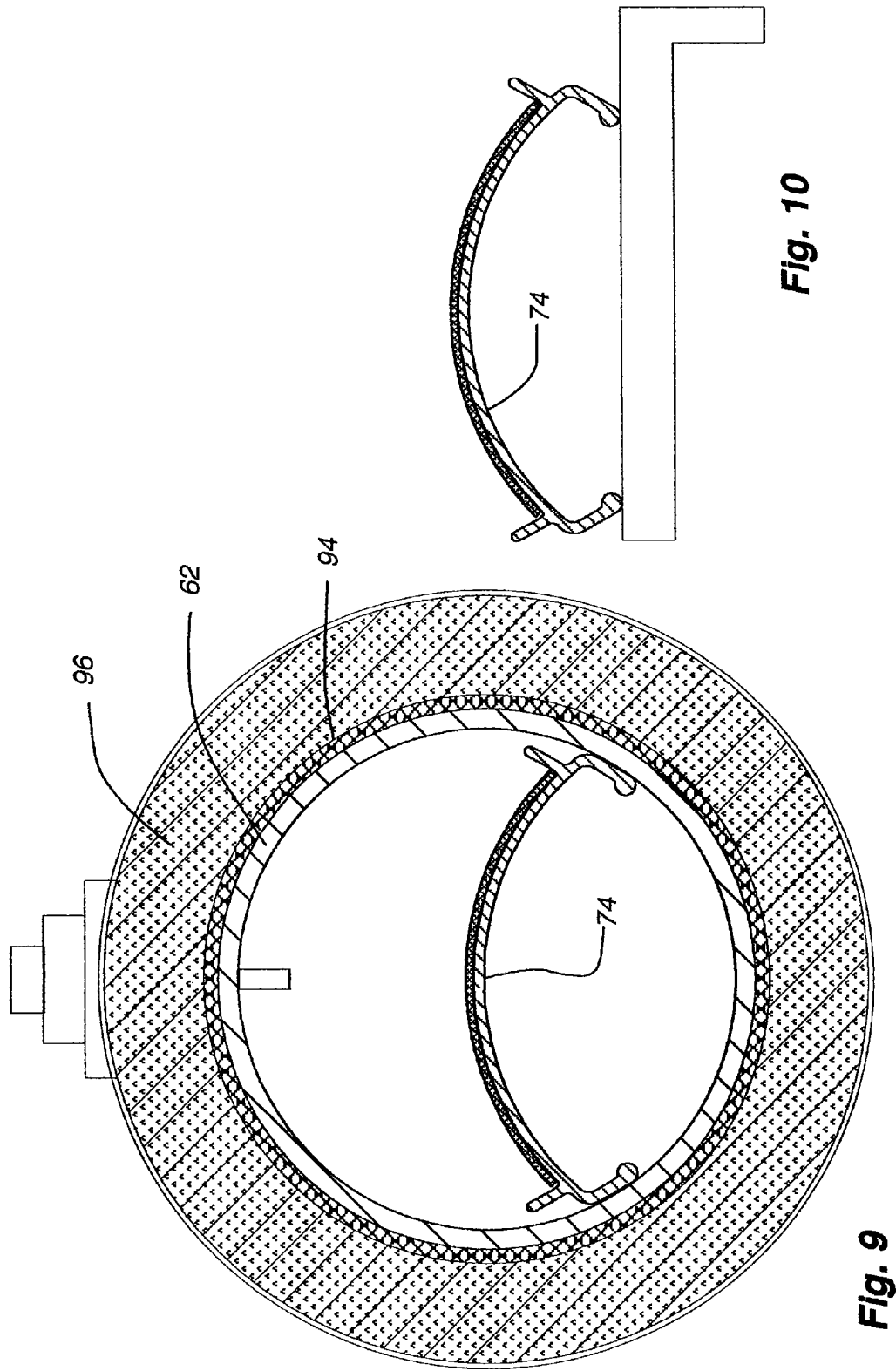

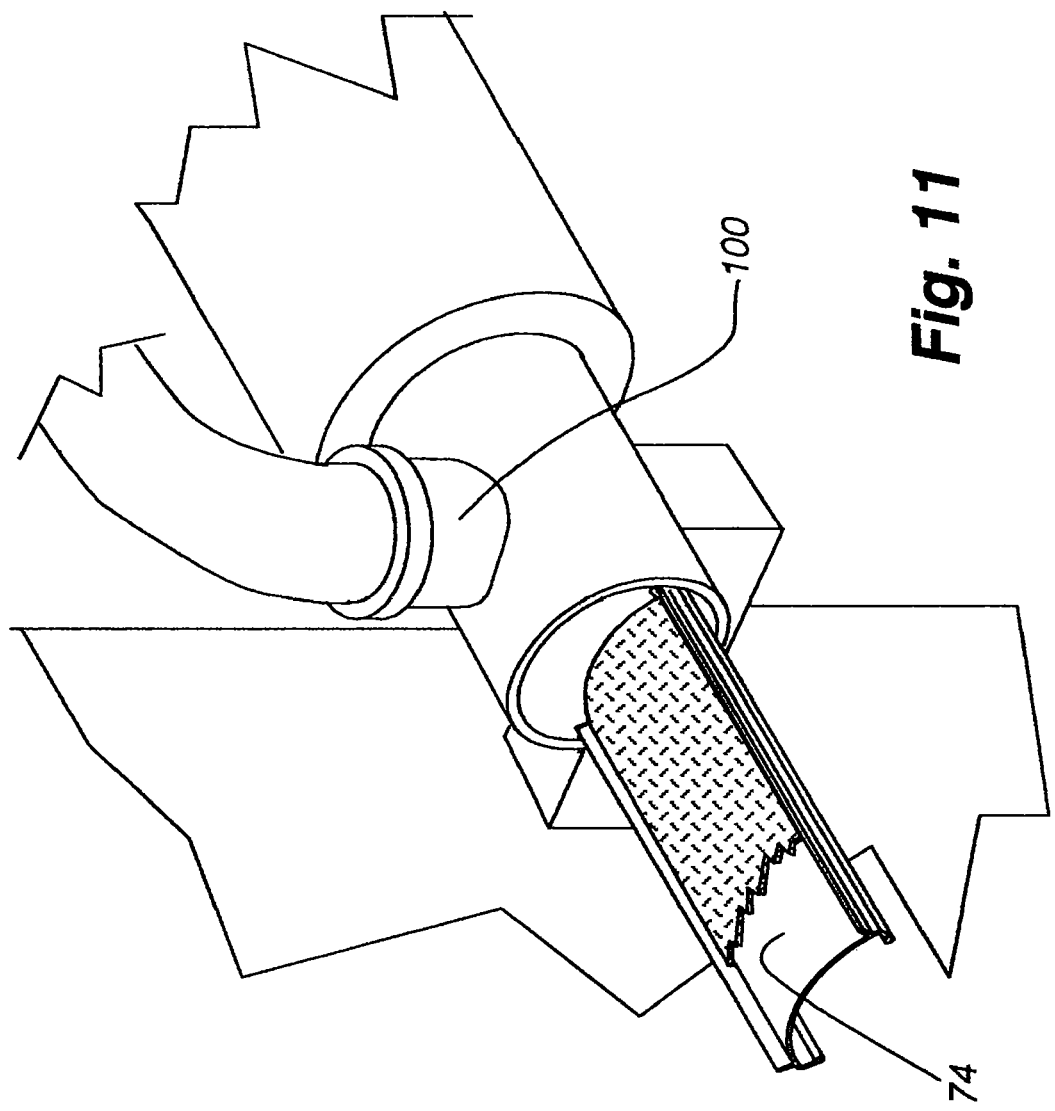

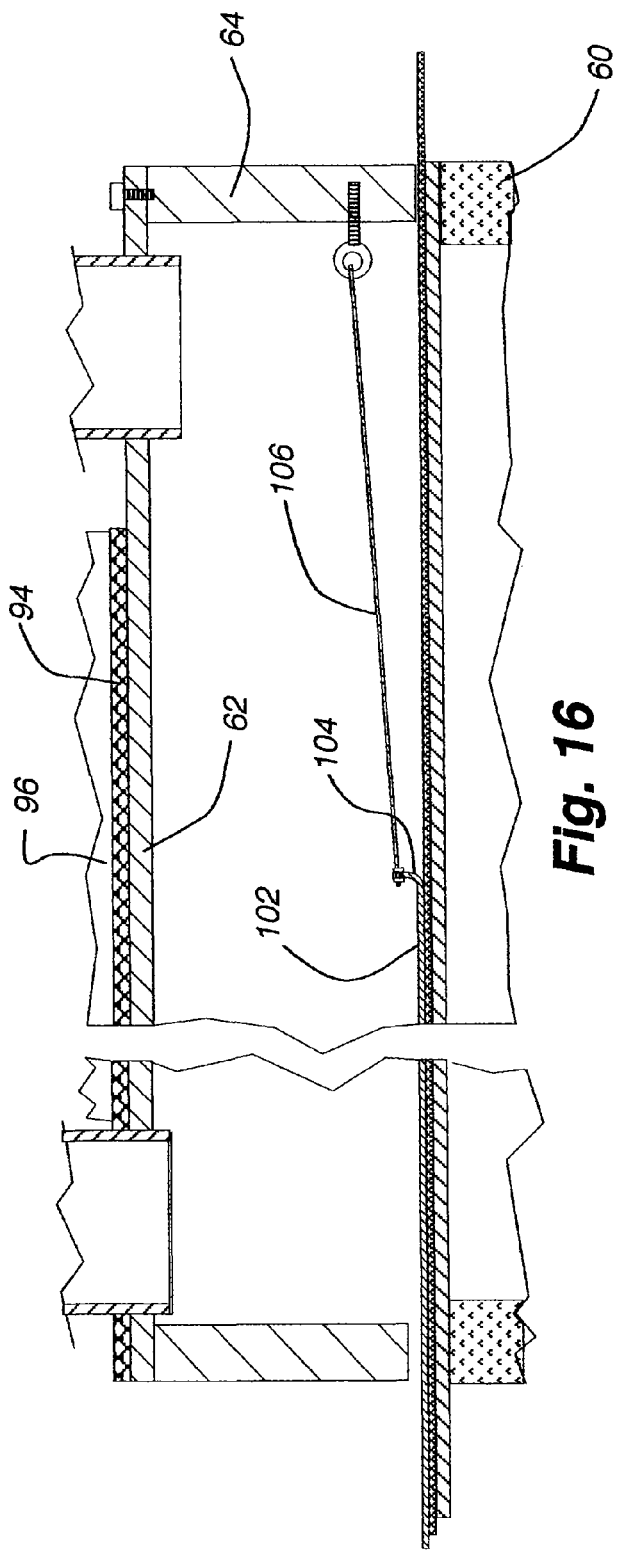
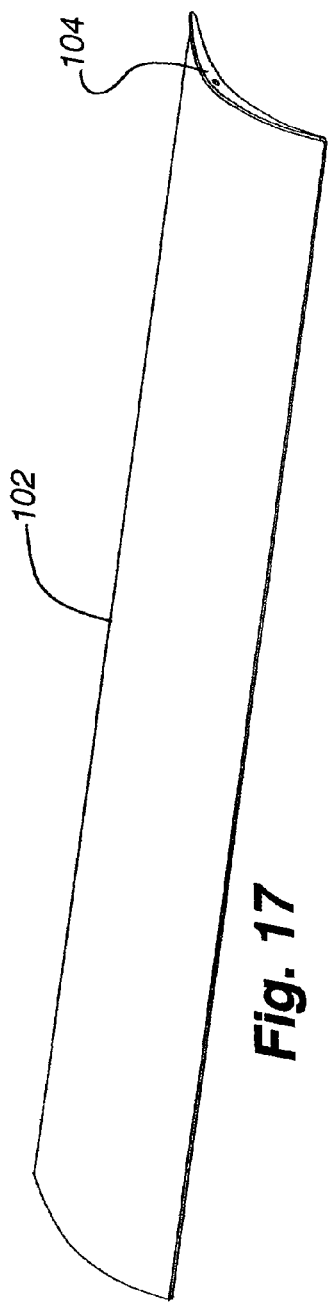

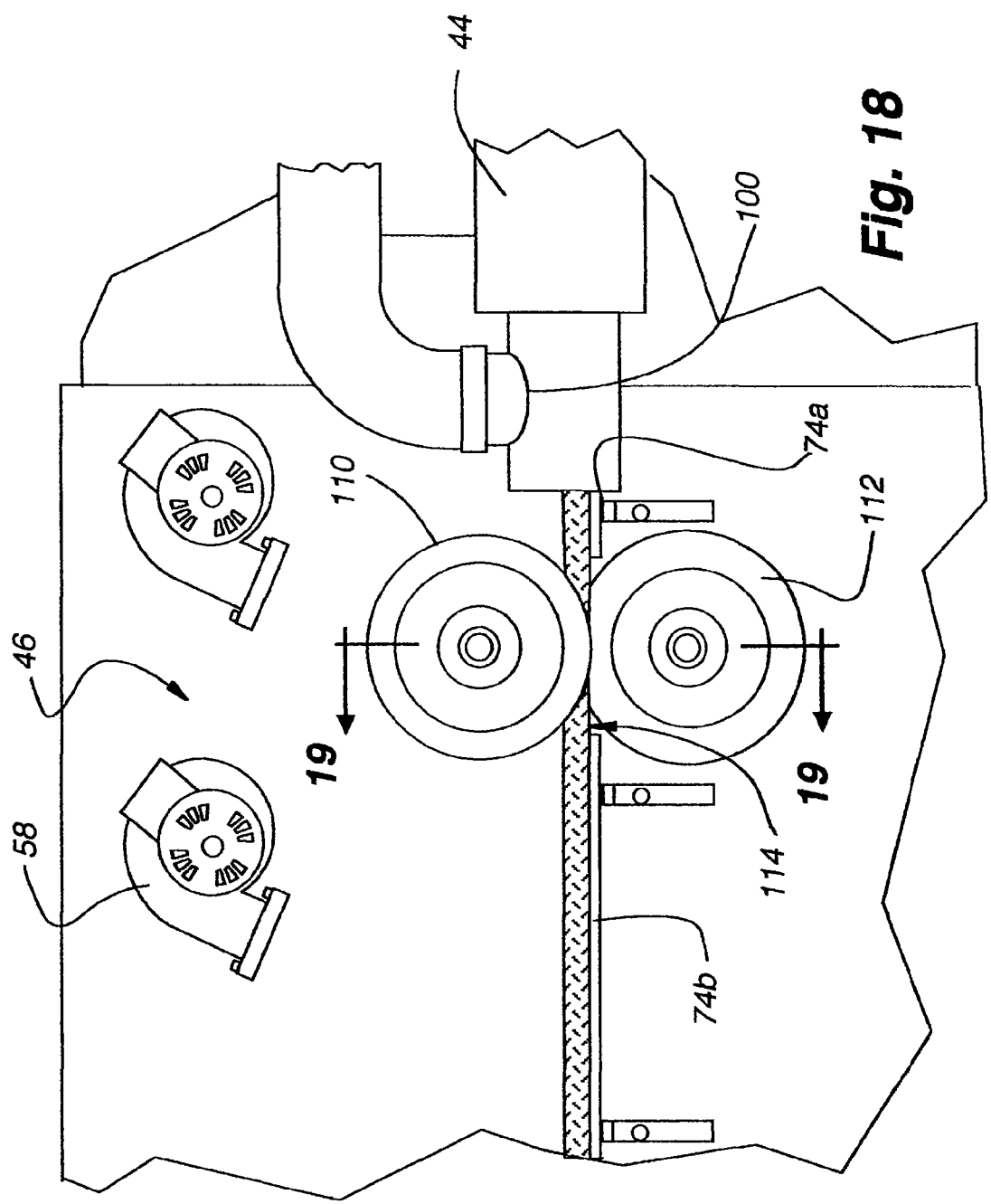

METHOD AND APPARATUS FOR FORMING SLATS FOR FABRIC IN COVERINGS FOR ARCHITECTURAL OPENINGS

CROSS REFERENCE TO RELATED APPLICATION

The present application claims the benefit under 35 U.S.C. §119(e) to U.S. Provisional Patent Application No. 60/702,794 ("the '794 application"), which was filed on Jul. 26, 2005, and entitled "Method and Apparatus for Forming Vanes for Fabric in Coverings for Architectural Openings." The '794 application is incorporated by reference into the present application in its entirety.

BACKGROUND OF THE INVENTION

1. Field of the Invention

The present invention relates generally to the formation of fabrics used in designer coverings for architectural openings such as windows, doors, archways, and the like and more particularly to a method and apparatus for forming an elongated semi-rigid slat or blade of arcuate transverse cross-section for incorporation into a fabric used in a covering for architectural openings.

2. Description of the Relevant Art

Coverings for architectural openings such as windows, doors, archways, and the like, have taken numerous forms over a long period of time. Coverings might simply constitute a fabric draped across a rod or other support in a permanent position but more popular coverings constitute retractable shades, fabrics, or the like. A popular covering used in architectural openings is a Venetian blind wherein a plurality of horizontally disposed slats are supported on tape or cord ladders so they can be rotated about their longitudinal axes between open and closed positions or retracted and extended across the opening in retracted and extended positions. Vertical blinds are similar to Venetian blinds except the slats extend vertically rather than horizontally. More recently, cellular shades have become very popular as they are not only aesthetically attractive but also insulative. Numerous forms of cellular shades have recently been developed and this has led to more interest in retractable fabric shades such as of the Roman Shade variety.

A variation of a Roman shade is disclosed in International Patent Application PCT/US2004/043043 filed on Dec. 21, 2004 and entitled "Retractable Shade For Coverings For Architectural Openings," which is of common ownership with the present application and incorporated by reference herein. In that application, the covering for an architectural opening includes a plurality of rigid or semi-rigid fabric elongated slats of arcuate transverse cross-section which are supported on a flexible support structure and suspended in an architectural opening for movement between extended and retracted positions. In the extended position, the slats slightly overlap each other while presenting a multi-curved sheet-like appearance and in a retracted position, the slats are gathered on their supporting structure adjacent a headrail for the covering along the top of the architectural opening. The slats can be supported on various support structures which might be, by way of example, a sheet of sheer fabric, a plurality of vertically extended cords or microfibers, or interconnected strips of flexible material allowing the slats to hang or droop downwardly in a generally vertical plane. It is to develop a process and apparatus for forming the slats used in such a covering that the present invention has been developed.

SUMMARY OF THE INVENTION

In accordance with the present invention, a roll of strip material capable of being heat formed is provided on an input spindle and fed across appropriate tensioning and preheating rollers before being fed into an elongated heat chamber. In the heat chamber, the strip of heat formable material is heated above a predetermined temperature so that it deforms as it is pulled across a forming extrusion of arcuate transverse cross-section so that the heat formable material drapes onto the arcuate extrusion. As the heat formable material passes from the heat chamber, it passes through a cooling station where fans blow ambient air onto the strip material to cool it from the semi-molten state it existed in within the heat chamber to a fairly rigid or semi-rigid molded state. The strip of material in its molded state is thereafter wound onto a take-up drum on which it is stored or transferred to an apparatus for forming fabric from the molded strips of material as described in copending application Ser. No. 60/702,715 entitled Apparatus and Method for Making Fabric Coverings for Architectural Openings, and filed on Jul. 26, 2005, which is of common ownership with the present application and hereby incorporated by reference.

In accordance with another aspect of the present invention, the strip material is provided as a resin coated non-woven material that is stable at temperatures of 356° F., and more typically up to at least 385° F. The non-woven material is formed from a combination of binder fibers and matrix fibers, the combination typically having a ratio, by weight, of from about 30:70 to 50:50 (binding fiber:matrix fiber). The combination of binder fibers and matrix fibers are melted together at temperatures sufficient to melt the sheath of the binder fibers. The cooled non-woven material forms a web of textile fiber containing material. A "B" stage resin, e.g., polyacrylic acid, is then coated or padded onto the non-woven material.

In accordance with another aspect of the present invention, the strip material is fabricated by first combining and melting the correct proportions of binding fiber and matrix fiber to form a base non-woven, textile fiber, material. The base material is then finished with a resin coating by drying the resin onto the base nonwoven material. The fabricated strip material has a predetermined thickness, including a predetermined thickness for the base nonwoven material and for the cured resin.

Other aspects, features, and details of the present invention can be more completely understood by reference to the following detailed description of a preferred embodiment, taken in conjunction with the drawings and from the appended claims.

BRIEF DESCRIPTION OF THE DRAWINGS

FIG. 6A is a fragmentary isometric of the outlet end of the apparatus of FIGS. 1 and 2 with no strip material thereon.

FIG. 9 is an enlarged section taken along line 9-9 of FIG. 3.

FIG. 10 is an enlarged section taken along line 10-10 of FIG. 4.

FIG. 11 is a fragmentary isometric looking at the outlet end of the heating chamber of the apparatus of FIGS. 1 and 2.

FIG. 16 is a fragmentary section taken along line 16-16 of FIG. 15.

FIG. 17 is an isometric of the drag plate used in the apparatus shown in FIGS. 15 and 16.

FIG. 18 is a fragmentary diagrammatic elevation showing a further embodiment for finishing the top and bottom surfaces of the strip material.

DESCRIPTION OF THE PREFERRED EMBODIMENT

Figure 2:
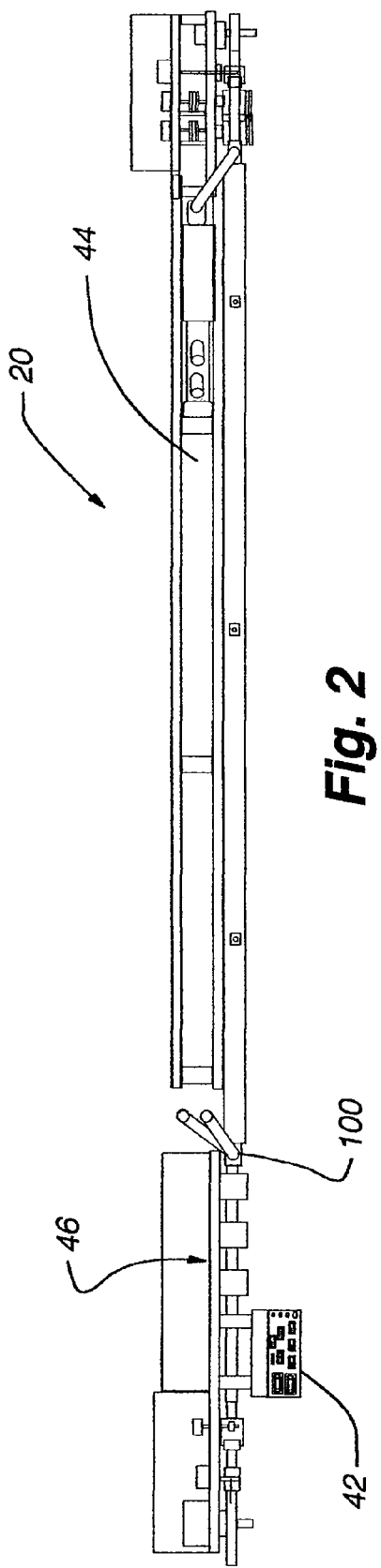
FIG. 2 is a diagrammatic top plan view of the apparatus shown in FIG. 1.
Figure 1:
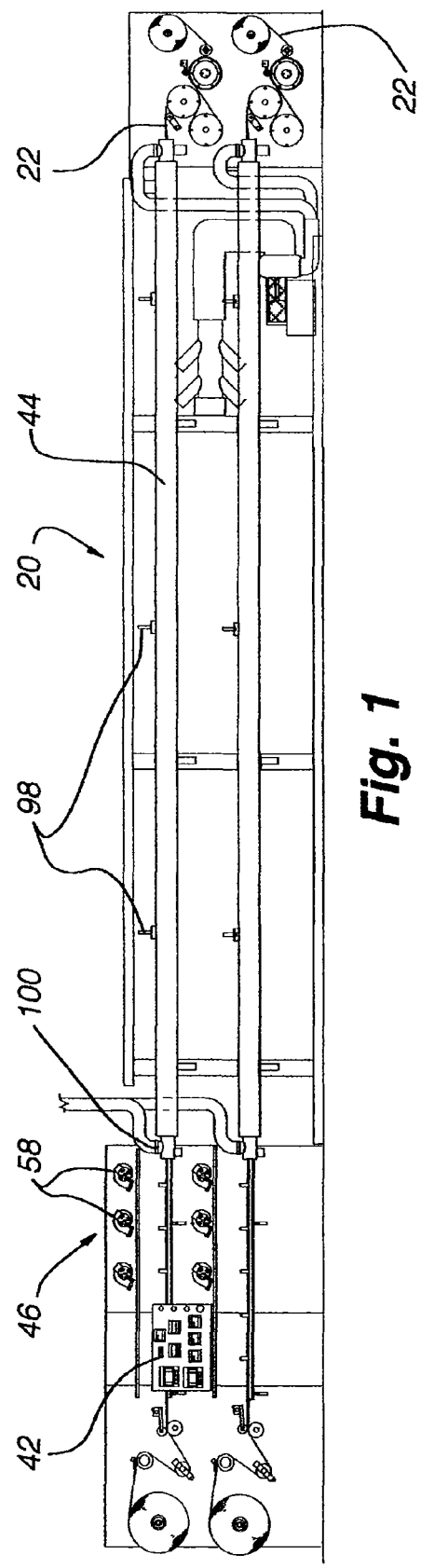
FIG. 1 is a diagrammatic elevation of an apparatus in accordance with the present invention.

The apparatus 20 of the present invention on which a slat, vane or blade for use in a fabric for coverings for architectural openings can be made is illustrated in FIGS. 1 and 2. The material from which the slat is formed is a strip material 22 provided on rolls that can be easily incorporated into the apparatus and replaced when the supply roll is expended. The material itself will be described in detail hereafter but for purposes of describing the apparatus and its method of operation, suffice it to say the material is preferably a somewhat flexible heat deformable textile material.

Before describing the apparatus, it should be appreciated the apparatus illustrated incorporates two substantially identical superimposed systems so that two strips of molded material 22 can be made simultaneously on the same apparatus. For purposes of the present disclosure, only the upper system will be described, it being understood that with the exception of a control station, the lower system is identical and any number of substantially identical systems could be incorporated into the same apparatus.

With reference to FIGS. 1 and 2, the upstream or input end of the apparatus is shown to the right with the downstream or output end on the left.

Figure 3:
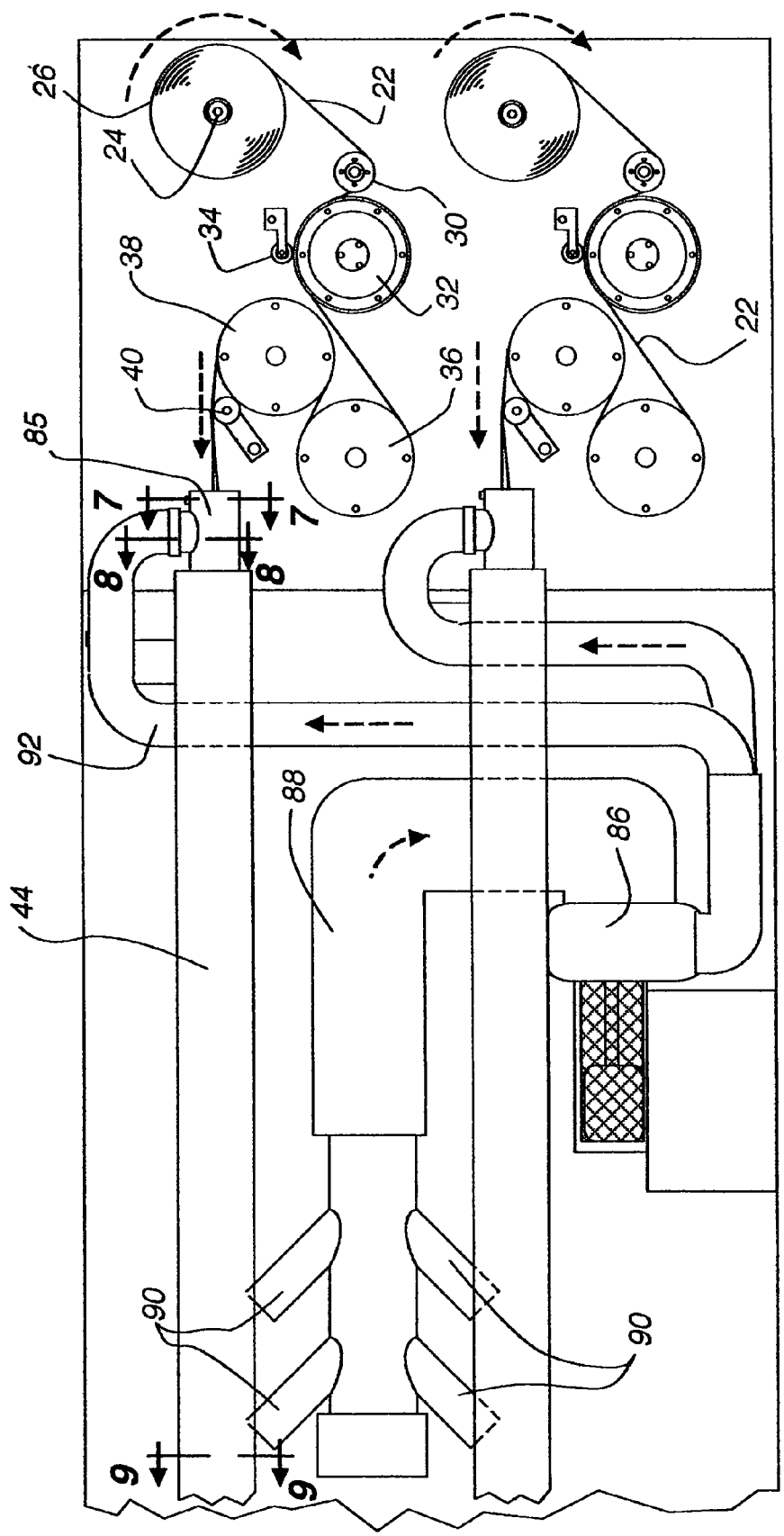
FIG. 3 is an enlarged fragmentary side elevation showing the inlet end of the apparatus of FIGS. 1 and 2.

Looking first at the upstream end of the apparatus 20, which can be seen in more detail in FIG. 3, a spindle 24 is provided on which a feed roll 26 of flexible heat deformable fabric strip material 22 can be mounted. The spindle has a built-in clutch brake (not seen) to provide an adjustable degree of braking to clockwise rotation of the roll. Before operation of the apparatus, the material 22 is hand fed through the apparatus from the feed roll 26 to a take-up roll 28 or drum at the downstream end of the apparatus. Strip material 22 emanating from the supply roll is first passed around an idler roller 30 and subsequently upwardly and across the top of a first driven roller 32 having a nip roller 34 adjacent thereto to provide positive traction. The strip material is thereby pulled off the supply roll against the resistance of the clutch brake by the first driven roller. Material coming off the first driven roller passes around a first 36 and subsequently a second 38 heated roller so that both sides of the strip material are exposed to a heated roller and the strip material is thereby preheated to a predetermined temperature. As the material emanates from the second heated roller, it passes across a tension detector roller 40 which detects the tension in the strip material. It should be pointed out that information relating to the tension in the strip material, the speed of the driven roller, and other parameters of information related to operation of the apparatus is displayed on a control panel 42 (FIGS. 1 and 2) at the downstream end of the apparatus with appropriate controls on the panel for adjusting the speed of driven rollers and thus the tension within the fabric strip as it passes through the apparatus, the temperature of the heated rollers and the temperature within a heating chamber 44 to be described hereafter.

After passing over the tension detection roller 40, the strip of material 22 is fed into the elongated heating chamber 44 and after emanating from the heating chamber passes through a cooling station 46 at the downstream end of the apparatus. At the downstream end of the apparatus as seen best in FIG. 4, the material initially passes over a second driven roller 48 with a nip roller 50 to assure positive engagement with the second driven roller pulling the strip material through the heating chamber and cooling station. After passing across the second driven roller, the strip of fabric material passes around a second tension detecting roller 52 and subsequently around an idler 54 before being wound on the take-up drum 28. Between the idler and the take-up drum, an anti-static device 56 engages the strip of material to remove static electricity. The take-up drum is also a driven drum the speed of which is automatically determined by the tension sensed by the second tension detecting roller 52.

Figure 4:
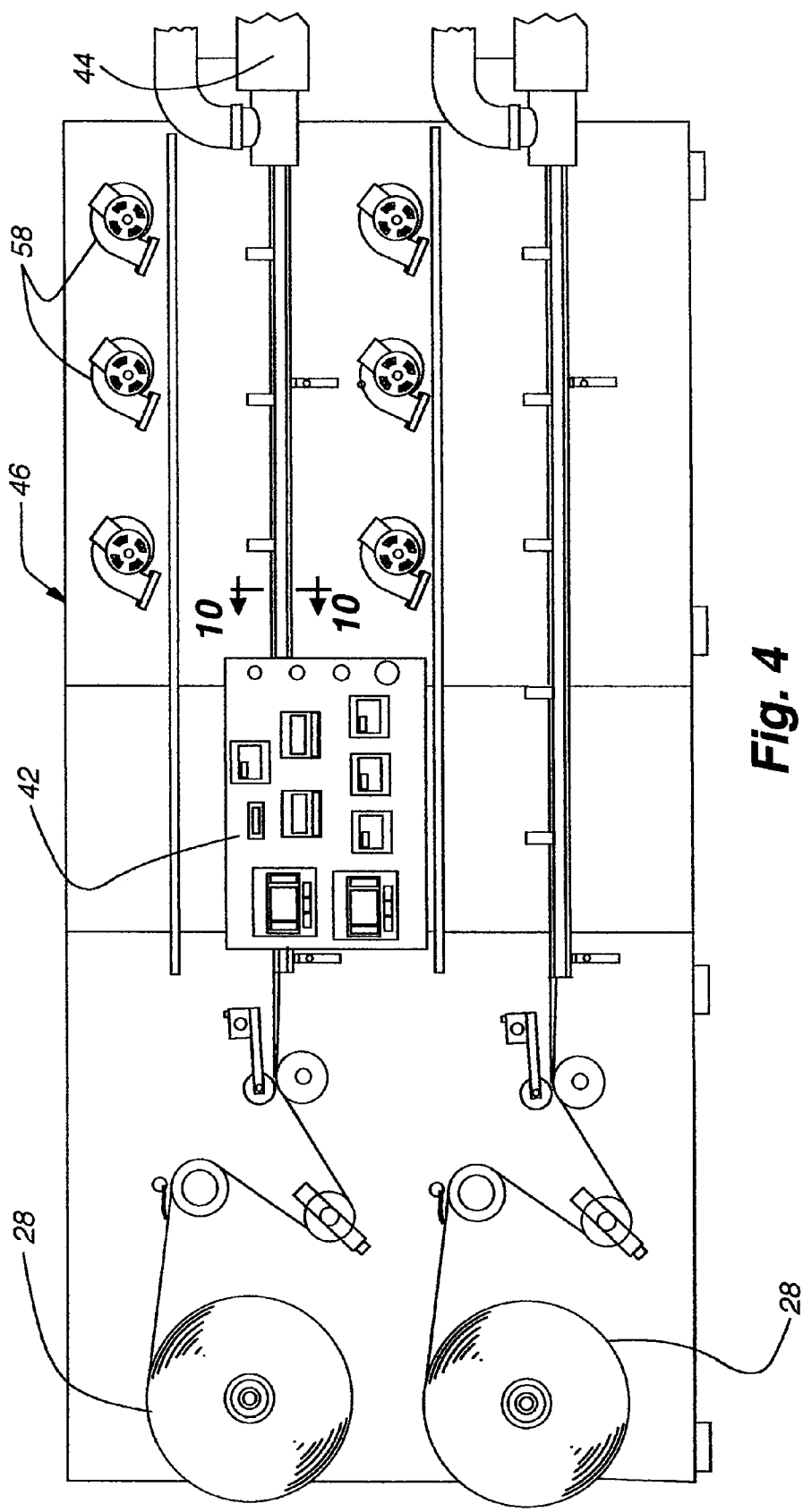
FIG. 4 is an enlarged fragmentary side elevation of the output end of the apparatus of FIGS. 1 and 2.
Figure 5A:
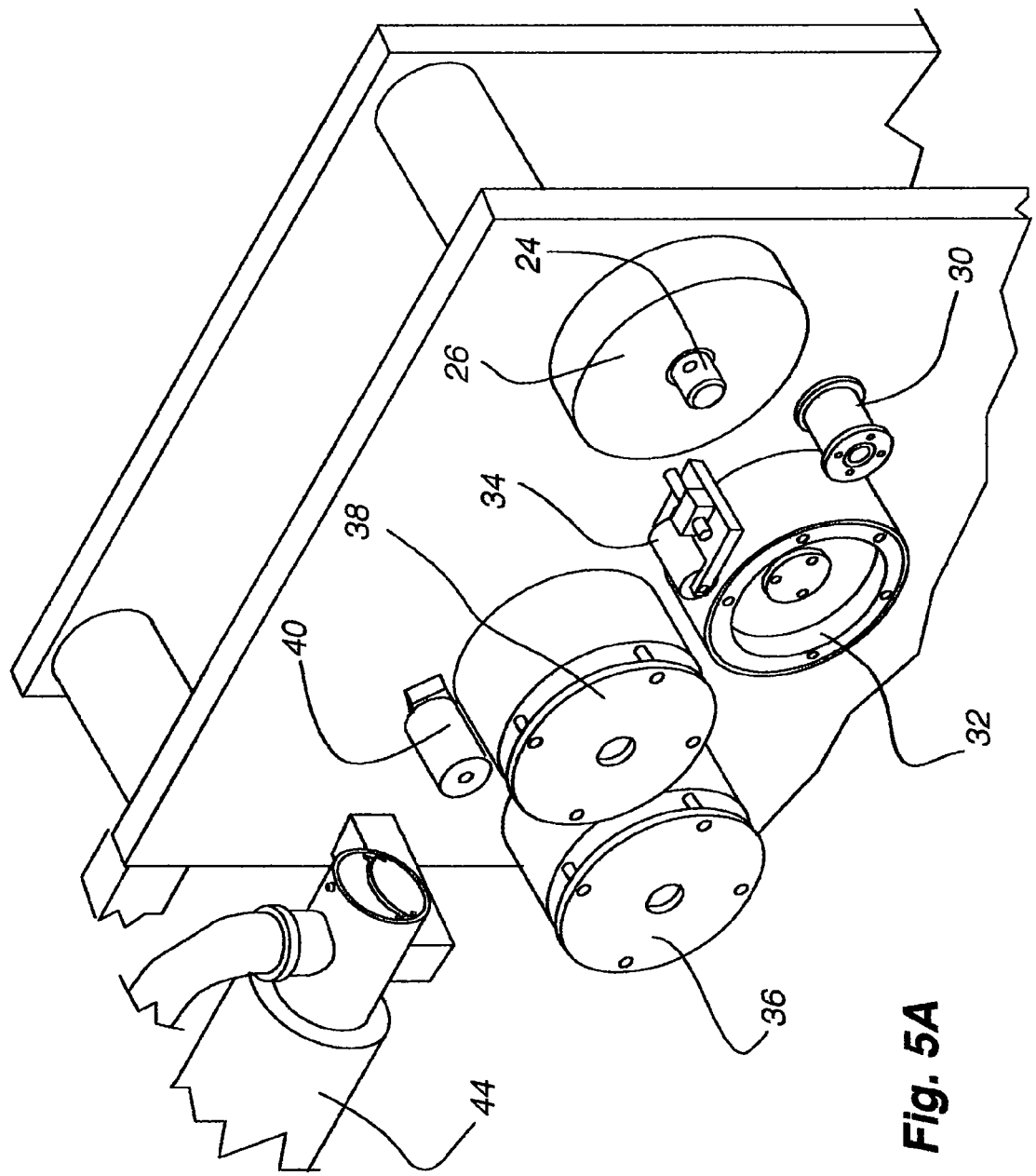
FIG. 5A is a fragmentary isometric showing the inlet end of the apparatus of FIGS. 1 and 2 with no strip material thereon.
Figure 5B:
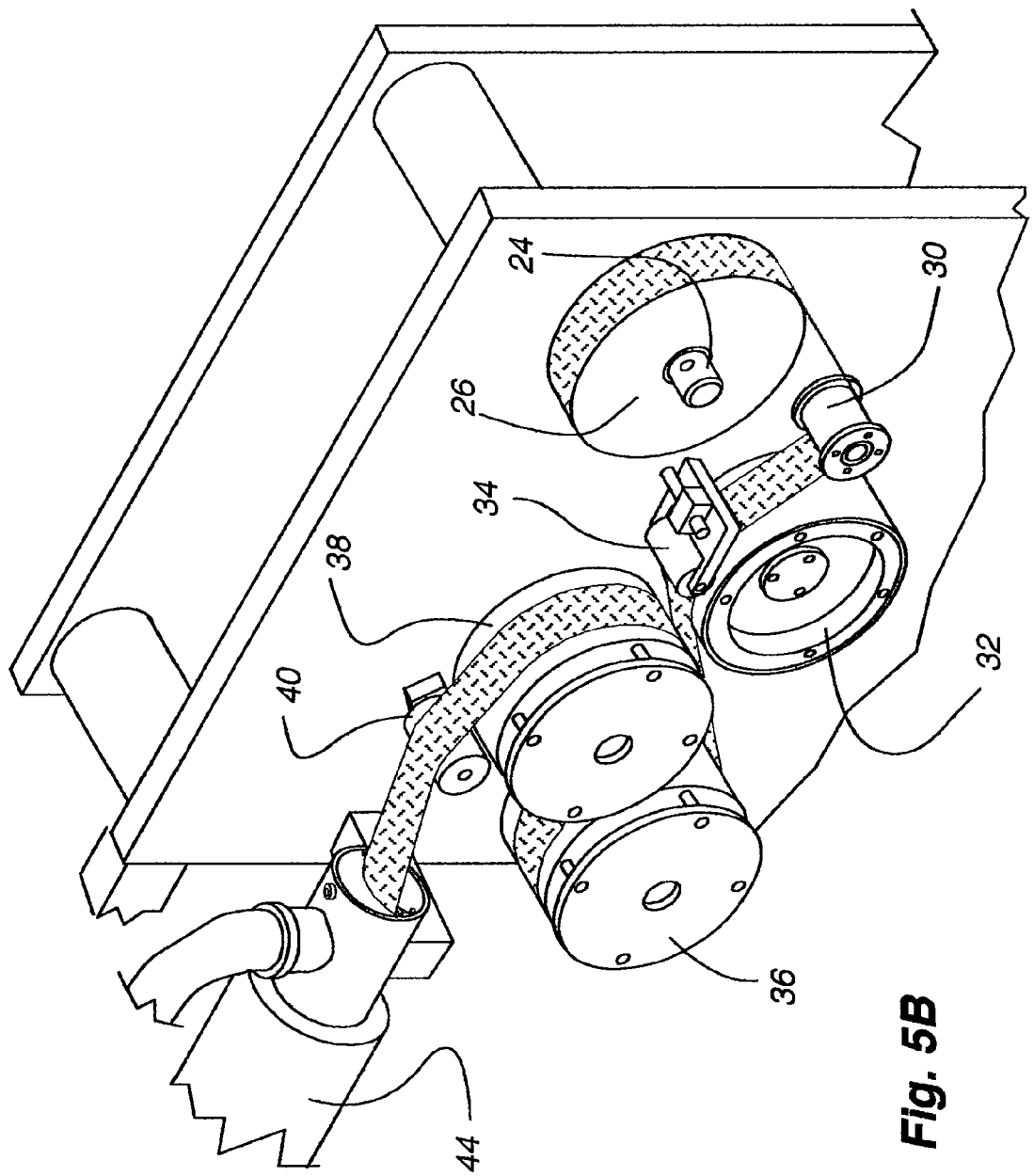
FIG. 5B is a fragmentary isometric similar to FIG. 5A with strip material incorporated therein.
Figure 6B:
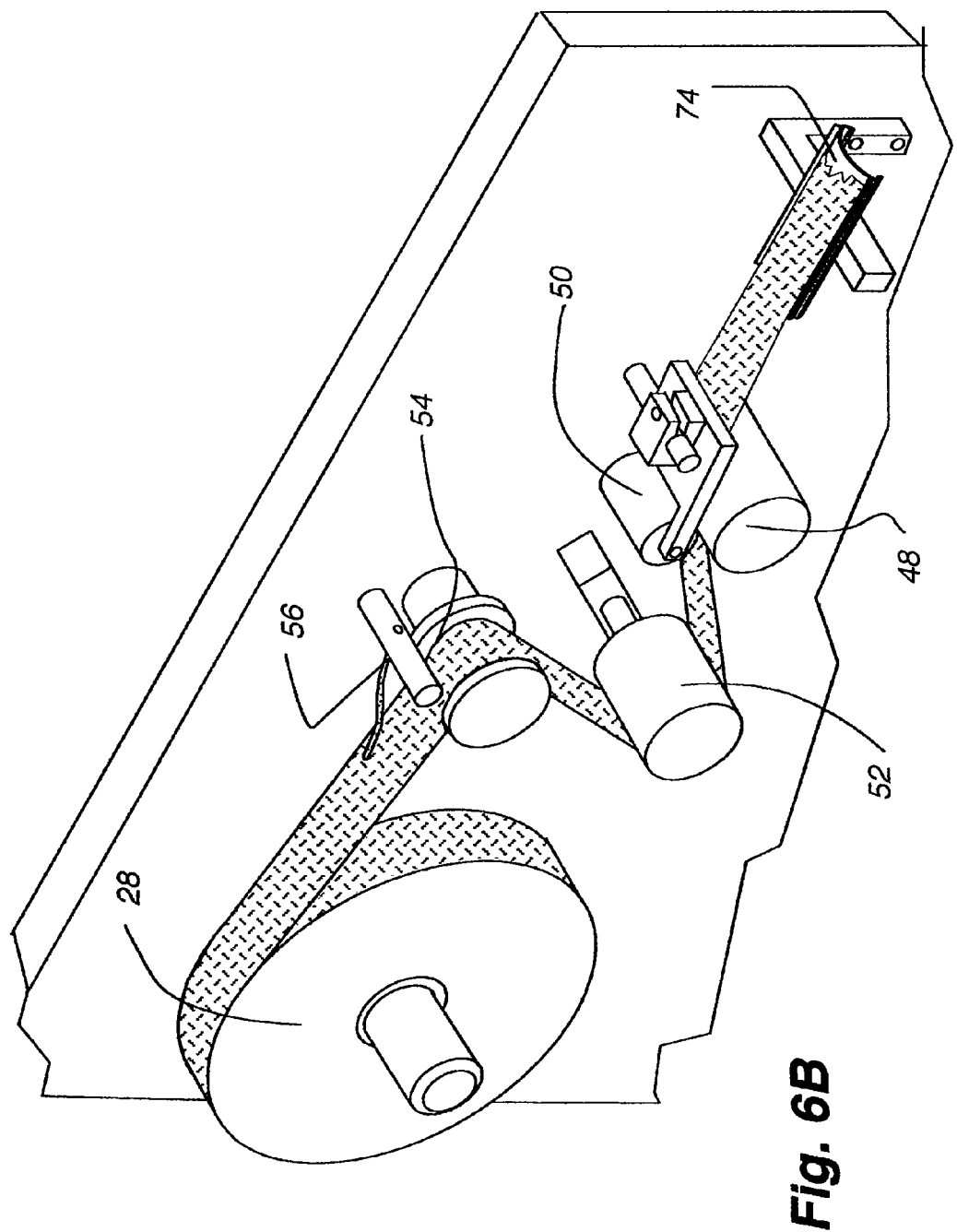
FIG. 6B is a fragmentary isometric similar to FIG. 6A with the strip material incorporated therein.

As the fabric emanates from the heating chamber 44, it passes through the cooling station 46 which is seen in FIG. 4 to simply comprise an area wherein the strip of material 22 is exposed to fans 58 blowing ambient air on the strip of material. The fans cool the material from the temperature at which it emanates from the heating chamber to a temperature desired for wrapping the material on the take-up drum. The strip material thereby passes from a semi-molten state in which it emanates from the heat chamber to a fairly rigid or semi-rigid molded state desired for use in coverings for architectural openings.

Figure 8:
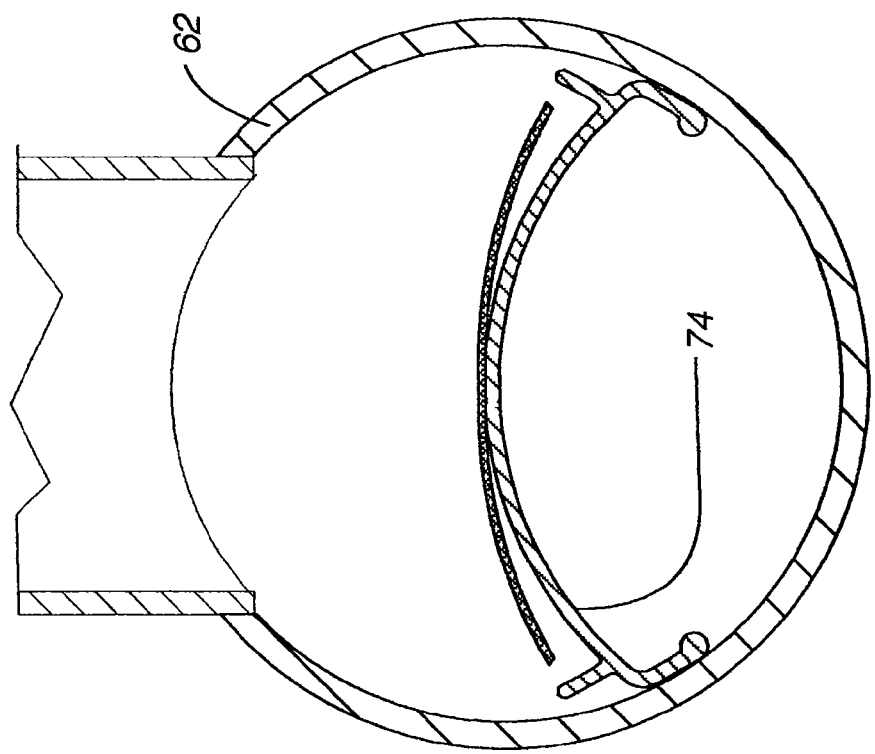
FIG. 8 is an enlarged fragmentary section taken along line 8-8 of FIG. 3.
Figure 7:
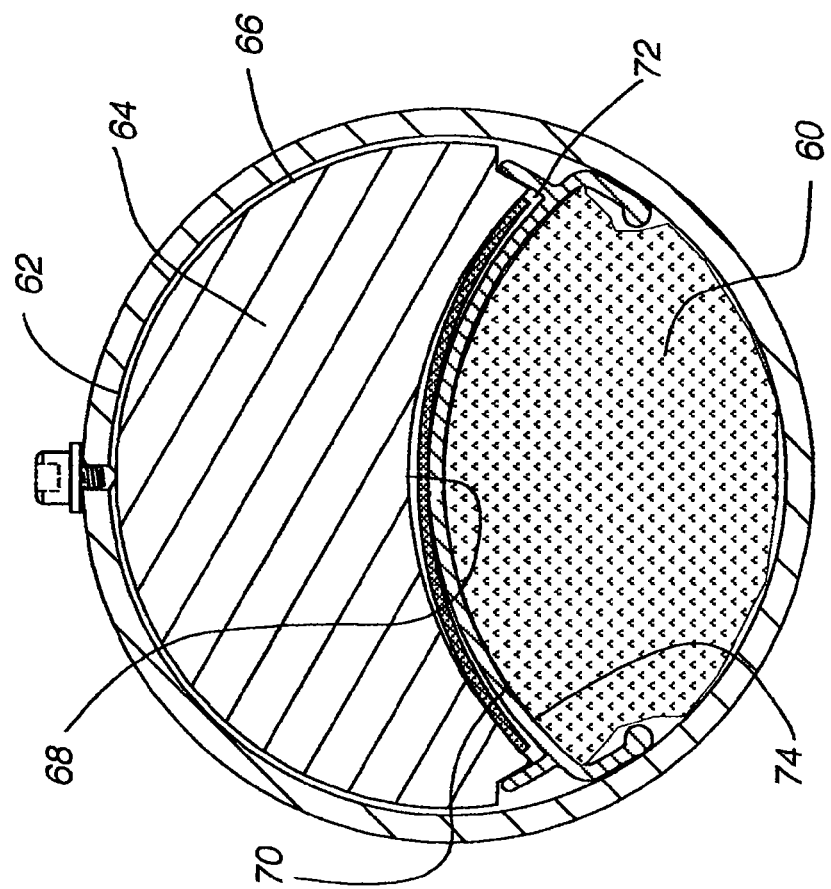
FIG. 7 is an enlarged section taken along line 7-7 of FIG. 3.
Figure 12:
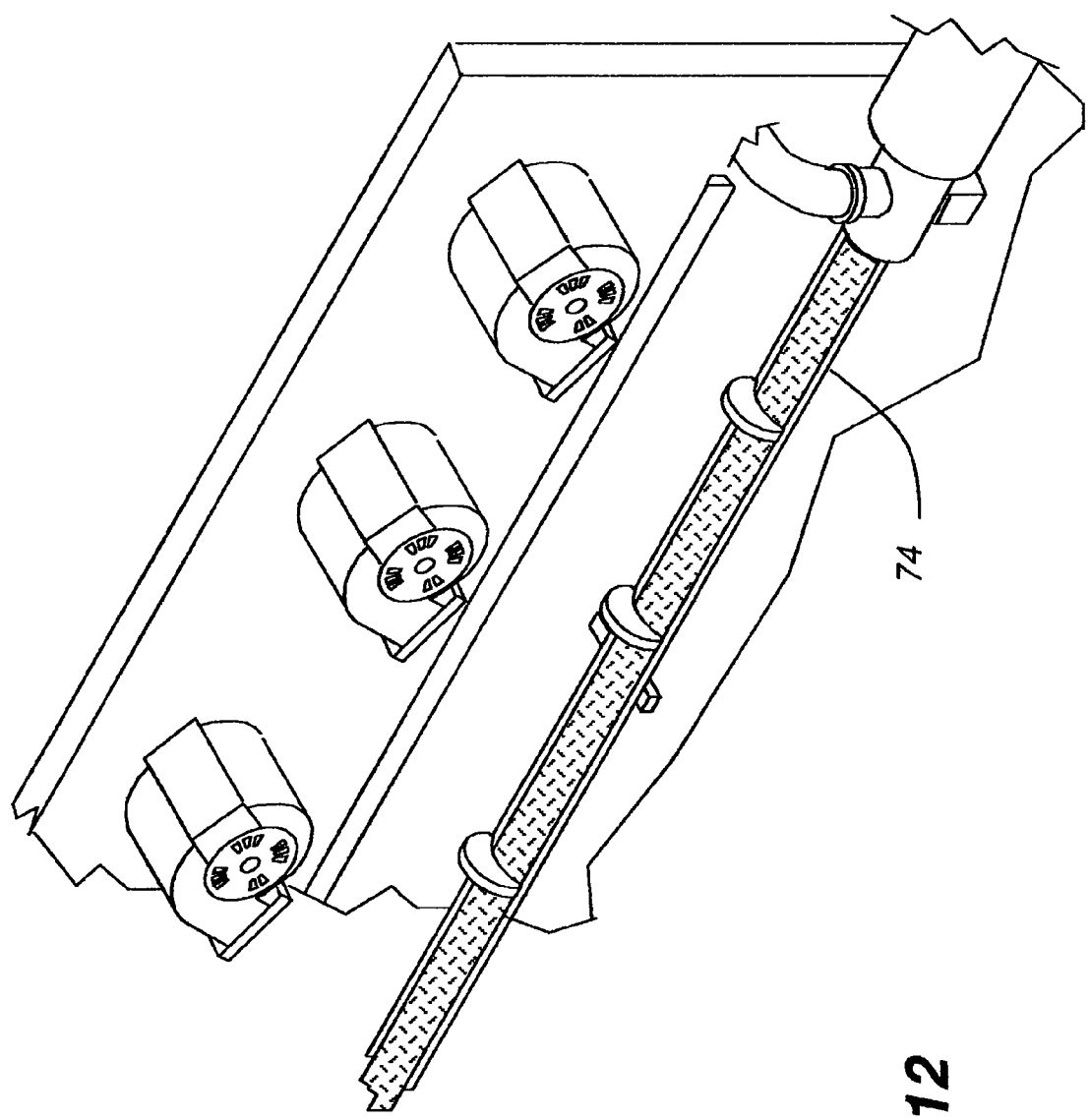
FIG. 12 is a fragmentary isometric looking at the cooling station of the apparatus of FIGS. 1 and 2.

At the upstream or inlet end of the heating chamber 44 as seen in FIGS. 7 and 8, an insulating block 60 of generally elliptical configuration forms part of a closure system and is positively positioned in the lower half of an elongated cylindrical tube 62 which extends the full length of the heating chamber. The tube might be made of stainless steel or other heat-conducting material while the insulating block could be a foam material. Above the insulating block and forming a complementary part of the closure system is a filler block 64 for example aluminum, which is of generally crescent shape so as to have an upper convex surface 66 and a lower concave surface 68 with the lower concave surface being spaced slightly from an upper convex surface 70 of the insulating block 60. An arcuate gap 72 is therefore defined between the insulating block and the filler block through which the strip of material can be fed.

Figure 13:
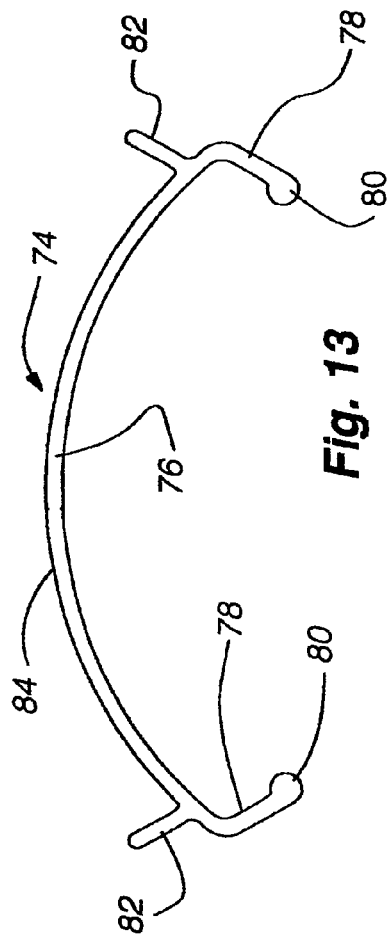
FIG. 13 is an end elevation of the forming extrusion.
Figure 14:
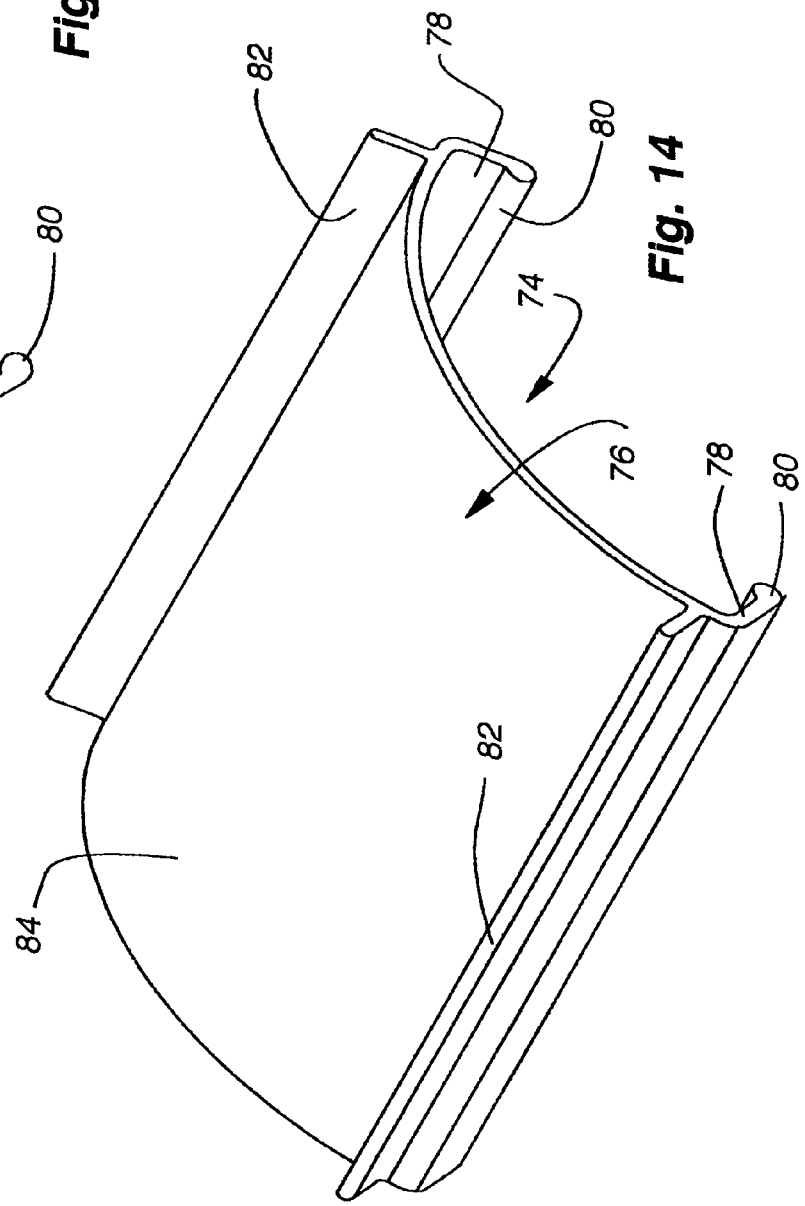
FIG. 14 is an isometric of the forming extrusion of FIG. 13.

An elongated static forming extrusion or support 74 extends through the heat chamber as well as the cooling station to support the strip material being formed in the apparatus. The extrusion can be seen in FIGS. 13 and 14 to have a downwardly concave arcuate main body 76 with downturned flanges 78 along opposite sides having beaded edges 80. Projecting upwardly and substantially perpendicularly from opposite sides of the top surface of the arcuate main body is a pair of spaced guide ribs 82. As possibly best seen in FIGS. 7-9, the extrusion rests on the interior wall of the cylindrical tube 62 so that the beaded edges 80 of the flanges 78 are equidistant from the bottom of the cylindrical tube. This of course disposes the extrusion in a substantially horizontal manner even though the main body defines an upwardly convex arcuate top support surface 84 for the strip material. The extrusion can be made of any suitable material that will withstand the temperatures in the heating chamber and has a low friction coating such as "Teflon" on its top surface.

The extrusion 74 is seen in the sectional view of FIG. 7 positioned between the insulating block 60 and the filler block 64 with a gap above the extrusion through which the strip material 22 passes. Immediately downstream from the location of FIG. 7 and namely at the location of FIG. 8, the strip material is seen to be drooping over the extrusion. This configuration of the strip material results simply from gravity and from the preheated state of the material which it acquired as it passed across the heating rollers 36 and 38 and through a preheat section 85 of the heating chamber 44 where preheated air is injected into the tubular heat chamber immediately downstream from the insulating and filler blocks.

As best seen in FIG. 3, a fan 86 is provided in the apparatus 20 near the upstream end thereof. The fan draws air through a heated duct 88 which is in communication with inlet tubes 90 so that air can be drawn through the heated duct by the fan and forced via a conduit 92 into the preheat section 85 of the heat chamber. The heated air is at a temperature slightly greater than the temperature of the strip material 22 as it enters the heating chamber 44 so as to continue to elevate the temperature of the strip material.

With reference to FIG. 9, the cylinder 62 is wrapped with a layer of heat tape 94 and a layer of insulation 96 is provided around the heat tape so as to concentrate the heat from the heat tape into the cylinder and consequently the hollow interior of the cylinder where the strip material 22 is being pushed and pulled through the heating chamber. The temperature of the strip of material increases as it is drawn through the heating chamber and as it gets hotter it droops further until it is fully draped upon the top surface of the extrusion as shown in FIG. 9. The strip material 22 is in a semi-molten state at this point in time but, as mentioned, the top surface of the extrusion is coated with a low friction material such as Teflon® so as to facilitate easy sliding movement of the strip material through the heat chamber even in its semi-molten state. Temperature detectors 98 (FIG. 1) are located at spaced locations along the length of the heating chamber and information therefrom is displayed on the control panel and used to assure desired temperatures in the heating chamber.

At the downstream end of the heating chamber 44 seen best in FIG. 11, hot air from within the heating chamber is drawn out of the heat chamber at 100 with a fan (not shown) and the downstream end of the cylinder has a closure system with identical insulating 60 and filler 64 blocks defining a gap therebetween through which the extrusion extends into the cooling station 46. In the cooling station, the strip material is exposed on the top of the extrusion 74 and further to ambient air blown thereon by the fans 58.

The insulating 60 and filler 64 blocks at the ends of the cylindrical tube are provided to retain heat within the tube 62 for optimal control of the heat treatment of the strip material.

FIG. 10 illustrates the strip material 22 in its fairly rigid or semi-rigid molded state near the end of the cooling station 46 and prior to the material being wrapped onto the take-up drum 28. Due to the chemical properties of the strip material to be described hereafter, the strip material remains in the transversely arcuate configuration illustrated in FIG. 10 as it is wrapped on the take-up drum.

Also due to the chemical properties of the strip material, it shrinks through the aforenoted process and accordingly the speed of the second driven roller 48 at the downstream end of the apparatus is slightly slower than the speed of the first driven roller 32 at the upstream end of the apparatus. As mentioned previously, however, the speed of the driven rollers, take-up drum, the tension within the strip material and the heat within the system, is all closely monitored and displayed at the control station where controls are provided for varying the parameters of operation of the apparatus.

Figure 15:
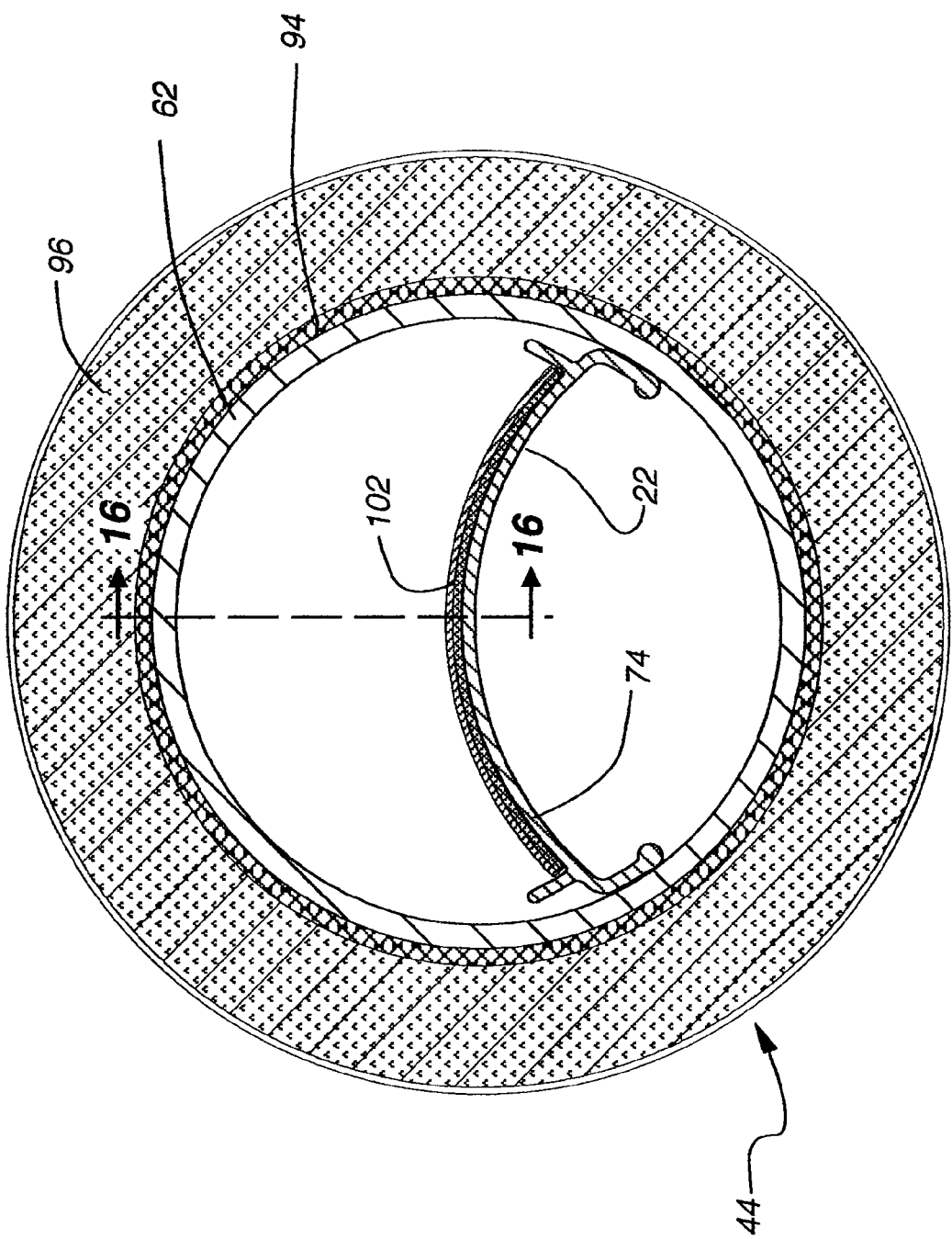
FIG. 15 is a vertical section through the heating chamber wherein a drag plate is further included for finishing the top surface of the strip material.

As an alternative to the apparatus 20 as described above, it is sometimes desirable to render the top and/or bottom surface of the strip material 22 smoother than it might otherwise be when formed with the above-described apparatus and to achieve this smoothness on the top surface a secondary plate 102 might be positioned within the heating chamber 44 and extended at least partially through the cooling station as shown in FIGS. 15-17 with the secondary plate having an arcuate transverse cross-section conforming with the convex top surface of the extrusion 74 and having a curled or upturned upstream lip 104. The lip could be tied with a cable 106 or the like to the filler block 64 at the upstream end of the apparatus with an eye fastener 108 so that the secondary plate floats on and therefore is merely supported or riding on the strip material and allowed to drag across the top surface of the material. The secondary plate would preferably be a smooth material such as stainless steel or the like to create a flat smooth top surface for the strip material as it is being formed within the heating chamber.

Figure 19:
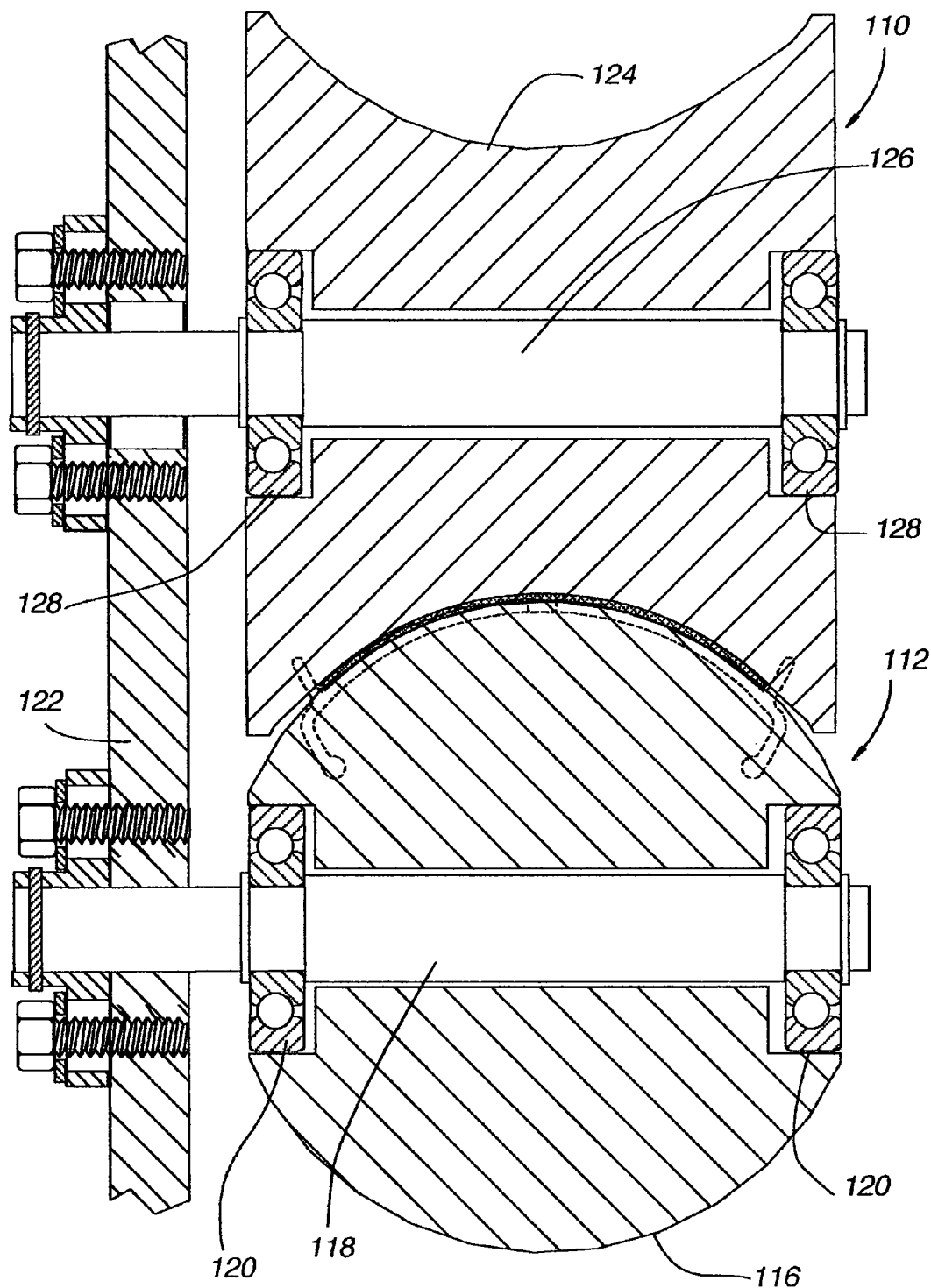
FIG. 19 is an enlarged section taken along line 19-19 of FIG. 18.

Another system for treating the strip material 22 so that both surfaces thereof can be smoother than created with the first-described embodiment of the apparatus is shown in FIGS. 18 and 19. It can there be seen that a pair of complementary rollers 110 and 112 are positioned respectively above and below the strip material 22 in engagement therewith by creating a gap 114 in the extrusion shortly after the extrusion protrudes into the cooling station 46 of the apparatus. In other words, there would be two linearly aligned extrusions 74a and 74b with one extrusion 74a extending through the heating chamber 44 and for a short distance into the cooling station and the other 74b at a downstream spaced position extending through the remainder of the cooling station. Within the gap 114 between the extrusions 74a and 74b, the rollers would be positioned so as to engage the material on the top and bottom thereof.

The bottom roller 112 in the preferred embodiment is generally spherical in configuration so as to have a circumferential convex surface 116 conforming in contour with the contour of the strip material 22 as it emerges from the heating chamber 44. This curvature on the lower roller would support the strip material in the gap between the extrusions. The roller would be mounted on a horizontal shaft 118 and on bearings 120 with the shaft being mounted on a side wall 122 of the apparatus.

The upper roller 110 would have a concave circumferential surface 124 around its circumference again of the same curvature as the strip material 22 emerging from the heating chamber 44. The concave surface on the upper roller is spaced slightly from the convex surface of the lower roller 112 to provide a space in which the strip material can pass. As with the lower roller, the upper roller is mounted on a shaft 126 with a pair of bearings 128 and again with the shaft mounted on the side wall 122 of the apparatus. As the material passes between the upper and lower rollers which are freely rotatable, they compress the upper and lower surfaces of the strip material to flatten and smooth the surfaces as may be desired.

The strip material 22 used in the afore-described apparatus is made in a two-step process. In the first step, a nonwoven base material or web is produced from a combination of binder and matrix fibers, i.e., combination of textile or textile-like fibers. In the second step, this base material is finished with a resin coating. The resin is finished onto the base material so as not to stick to itself on the supply roll and with no cross-linking.

The non-woven base material is produced from a combination of textile fibers that are stable at temperatures of 356° F., and more typically stable up to at least temperatures of 385° F. In the preferred embodiment, the base non-woven material is a combination of binder fibers and matrix fibers. A ratio, by weight, of binder fiber:matrix fibers of from about 30:70 to about 50:50 is envisioned for use in the base nonwoven material, having a preferred ratio of about 40:60.

Binder fibers in accordance with the present invention are defined as uniform fibers or, in the preferred embodiment, fibers having a core and a sheath, with at least the sheath being heat sensitive, i.e. a thermoplastic, so it can be melted in a thermo-binding process to thermo-mechanically construct the base nonwoven material. The binder and matrix fibers are available in different melting points, with the matrix fiber typically being a standard high-melting point polyester fiber (above 400° F.) so the binder fibers can be melted without melting the matrix fibers to establish the desired thermo-bond between the fibers. In both cases (binder and matrix), it is preferable to use the lowest denier (fiber size) available. In one embodiment, the denier is approximately 1.5. Note that lower denier fibers give the finished product the maximum whiteness in an architectural opening, where coarser deniers tend to give a gray appearance when viewed with daylight behind them.

Note also that base non-woven materials having lower binder fiber contents, i.e., below 30% (by weight) of the material, are less uniform in appearance in the architectural opening. Alternatively, base non-woven materials having higher binder fiber content, i.e., above 75% (by weight), tend to be very "paper-like" and therefore unsatisfactory for the uses required herein.

In one illustrative example of the base non-woven material, it is approximately 67 grams per square meter (gsm). The base nonwoven is composed of a MD (machine direction) carded layer of both binder and matrix fibers and an underlying XD (cross direction) carded layer of both binder and matrix fibers. The binder fiber in the preferred embodiment is obtained from Fiber Innovation Technology, 398 Innovation Drive, Johnson City, Tenn. 37604 USA, and identified as product No. T202. The fiber is 3.0 denier and has a 1.75 inch fiber length. The matrix fiber in the preferred embodiment is obtained from William Barnet & Son, LLC, 1300 Hayne Street, Arcadia, S.C. 29320 USA, and identified as product No. T1250. The fiber is 1.2 denier and has a 1.2 inch fiber length. Approximately 55-57 gsm of the base non-woven material is the MD layer and 10-12 gsm is the XD layer.

The binder fiber melting temperature, as used in the nonwoven base material, is a consideration for the efficient conversion of the nonwoven base for use as a slat in a fabric product for coverings for architectural openings. The softening temperature of the nonwoven base material must be high enough to be stable during the finishing process, i.e., curing of the resin in the nonwoven base during molding. In addition, the softening point of the nonwoven is effected by the ratio of binder fiber to matrix fiber.

In a preferred embodiment, the binder fiber used in the base nonwoven has a melting point of 356° F. The softening point of a base nonwoven material composed of this fiber, at a 40:60 ratio (binder fiber:matrix fiber), is approximately 365° F. If, for example, the binder fiber melt temperature were raised to 390° F. in a 40:60 ratio construction, the result would be a base nonwoven with a higher softening point of approximately 375° F. Alternatively, if the binder fiber to matrix fiber ratio were increased to 50:50 or 60:40, the resulting nonwoven web would soften at approximately 355° F. and 345° F. respectively. One aspect to the base nonwoven material is to soften the material with temperature, let it form around a mold, in this case the linear extrusion 74, just prior to setting the resin within the web.

The resin for coating or finishing the base nonwoven material is preferably a polyacrylic acid or other like resin. An illustrative resin example is purchased from Rohm & Haas, 100 Independence Mall West, Philadelphia, Pa. 19106-2399, and is identified as T-Set 1AC. The finishing process entails the resin be coated onto the base nonwoven material and allowed to dry. The dried resin is then cured (by heat) onto the base nonwoven material during the molding process in the heat chamber 44.

An illustrative example of the fabrication of the strip material is provided: the two-layer carded base nonwoven of binder and matrix fibers can be thermally bonded with through-air-bonding. In through-air-bonding, hot air is forced through the web material to melt at least the sheath of the binder fibers discussed above. These melted fibers then flow to bond to the matrix fiber. During through-air-bonding, the web of material mat is compressed to approximately $\frac{1}{20}^{th}$ of its initial thickness (i.e., from 4 inches to about 0.2 inches). Upon leaving the bonder, the nonwoven material passes through a finishing calendar that helps to gauge the material to a targeted thickness. The targeted thickness for the base nonwoven material upon leaving the through-air-bonder is 0.0009-0.011 inches thick. In one aspect of the manufacturing, the amount and ratio of binder and matrix materials is maintained at a thickness approximately 0.004 inches thinner than that of the desired finished product thickness. A phenomenon referred to as "blossoming" is responsible for this specification and will be discussed hereafter. With regard to the resin finishing process in the preferred embodiment, the base nonwoven material is first unwound and then passed through a vertical nip that contains a reservoir of foam. Within this foam is a specific percentage of resin, for example the polyacrylic acid as sold by Rohm & Haas, T-Set 1AC. The amount of T-Set in the foam bath is needed to give a consistent solids add on of about 23%. As the material passes through the nip, the foam is collapsed and the chemistry saturates the nonwoven material. The material is then dried on a series of dry cans. The temperature of the drying section must not exceed 290° F. so as not to begin the cross-linking process (curing). The material is then rerolled and inspected. Note, in an alternative embodiment, the 1AC resin can be padded onto the base nonwoven.

There is another aspect of the finishing process that is noted herein. When the base nonwoven material is exposed to heat such as that in drying, the material will expand in thickness. For example, before the finishing process, the material is 0.009-0.010 inches thick. After the finishing process, the base nonwoven material is 0.012-0.013 inches thick. Although not being bound by a theory, it appears the stress placed in the base nonwoven material during through air bonding in the fabrication of the base nonwoven material is relieved slightly during the finishing process. The material will subsequently get slightly thicker when it is exposed to the temperature of the curing process or molding process described above. The finished slat or blade thickness has a target of approximately 0.015 inches thick (combined thickness of base non-woven having resin finish).

With regard to the "blossoming" aspect of the base nonwoven material, the material may be "exploded" by increasing operating temperatures to produce very soft, structurally durable, molded nonwovens in a thickness range of 0.0015-0.020. Conversely, the material can be "conditioned" in several ways to a thickness less than that received by the vendor. The term "conditioned" refers to anything done during the molding process to change the physical properties or surface condition of the nonwoven. For instance, if a matched set of curved calendar rollers are added to the apparatus described above, just after the material exists the end of the heating chamber, and just prior to cooling, then the gauge of the material and the smoothness of the material can be manipulated. If a pattern were desirable, it could be engraved into the above-described rollers. Since the nonwoven is in a semi-molten state upon leaving the heat chamber, it can be shaped, formed, or stamped in any desired fashion.

It is envisioned that the overall composition of the strip material (binder and matrix fiber) be made from thermoset and/or thermoplastic polymers. When thermoplastic polymers are used to form the base nonwoven material, the end product strip would be used in environments that would avoid excessive heating, and could not be used where the heating exceeds the melting point(s) of the thermoplastic polymer(s). In the preferred embodiment, the binder fibers have a thermoset core and a thermoplastic sheath and the matrix fibers are a higher melting point thermoplastic.

As an alternative to the method described above for forming the transversely arcuate slot material, the apparatus could be altered to add a secondary curved plate or extrusion (not shown). This secondary plate would sit freely on top of the curved extrusion. As the material passes through the heat chamber to the cooling station, the contact between the strip material and the secondary plate would tend to polish the convex upper side of the strip material. The strip material treated in this manner would exhibit a smooth surface and depending on downward pressure, the strip material may be thinner in thickness.

As another alternative, one could also take the strip material in its semi-molten state and crease and/or fold the material upon its leaving the heat chamber. Strip materials assuming these various shapes or configurations could be used as valances for a covering for architectural openings or in other fabrics such as fabrics of cellular construction so as to bias the cellular fabric material to an open condition.

As mentioned previously, in the preferred form of the apparatus, there are identical upper and lower systems so that two strips of material can be treated simultaneously. In the machine described above, the heat chamber is approximately 25 feet long while the extrusion is 32 feet long leaving a cooling station that is 7 feet long. For the material to be fully cured in a prescribed time period and defined temperature, the material is pulled through the apparatus at a speed of approximately 25 feet per minute.

While the material passes through the apparatus, the residual shrinkage in the machine direction of the apparatus can be controlled by either slowing down or speeding up the speed of the take-up roller. If one were to run a slow take-up speed, the strip material is allowed to shrink considerably in the heating chamber, then the resulting material is "low shrink." If the speed of the take-up drum is increased closer to the speed of the input of the strip material into the heat chamber, then the material will have a relatively "high shrinkage" rate. This is important because it has been shown that a covering for an architectural opening which poses "high shrinkage" will bow in a concave direction toward the architectural opening because the material has residual shrinkage. The space between the covering and the architectural opening builds heat. In some cases, the heat may reach 225° F.

In the embodiment of the invention described above, the strip material is allowed to shrink approximately 0.8% in the heat chamber.

The strip material will be exposed to a temperature that is approximately in the range of 375° F.-385° F. within the heat chamber for a period of approximately one minute. This is the recommended time and temperature for curing the 1AC resin used in the disclosed embodiment. Temperature, pressure and speed all affect the process. If the speed of the process is increased, the heating temperature can be increased and the cooling temperature decreased without necessarily changing the length of the machine. Applying pressure may have a similar impact, as could the use of supersaturated steam to heat the material or adiabatic cooling to cool the substrate.

It will be appreciated from the above that a method and apparatus for forming an arcuate semi-rigid slat or blade for use in a covering for architectural openings has been described which is a straight inline process with adequate controls for assuring uniform production of a transversely curved strip of material that can be later cut to length dependent upon the width of the fabric being formed with the slats or blade material.

Although the present invention has been described with a certain degree of particularity, it is understood the disclosure has been made by way of example and changes in detail or structure may be made without departing from the spirit of the invention as defined in the appended claims.

The invention claimed is:

1. An apparatus for forming a transversely curved slat for use in a covering for an architectural opening comprising in combination:
   a supply roll of strip heat deformable flexible fabric material,
   a first driven roller for pulling said strip material from the roll,
   an elongated heat chamber through which said strip material can be passed and thermally deformed,
   a cooling station downstream from said heat chamber,
   an elongated static support of arcuate transverse cross-section extending through said heat chamber and along said cooling station along which said strip material can be drawn and supported,
   a second driven roller for pulling said strip material through said heat chamber and cooling station, and
   a tension detecting device downstream from said first driven roller and upstream from said static support in said heat chamber, said tension detecting device being operatively engaged with said strip material to detect the tension in said strip material.

2. The apparatus of claim 1 further including a driven take-up drum downstream from said second driven roller and a second tension detecting device in operative engagement with said strip material downstream from said second driven roller.

3. The apparatus of claim 2 wherein said heat chamber is an elongated hollow tube through which said support extends longitudinally and including a system for heating the interior of said tube.

4. The apparatus of claim 3 further including a closure system at each end of said hollow tube with a slot there-through to accommodate sliding movement of said strip material through said closure systems.

5. The apparatus of claim 3 wherein said heat chamber has a pre-heat section at its upstream end immediately downstream from the closure system at the upstream end of said heat chamber.

6. The apparatus of claim 3 wherein said elongated support has longitudinal rails to confine said strip material therebetween.

7. The apparatus of claim 3 wherein the top surface of said support is convex and including a plate slidably supported on said strip material in overlying relationship with said support and wherein said plate has a surface that is concave downwardly in complement to the convex top surface of said support.

8. The apparatus of claim 7 wherein said plate has an upturned upstream edge.

9. The apparatus of claim 1 wherein said cooling station includes fans for blowing air across said strip material.

10. The apparatus of claim 9 wherein said air is ambient air.

11. The apparatus of claim 1 wherein said support is discontinuous at the upstream end of said cooling station and at said discontinuity is a set of rollers between which said strip material can pass, said rollers including circumferential confronting faces of complementary convex and concave configuration.

12. The apparatus of claim 3 wherein said hollow tube is made of a heat conductive material, is wrapped with heat tape and a surrounding layer of insulating material.

13. The apparatus of claim 3 wherein said hollow tube is in communication with a supply of heated air.

14. The apparatus of claim 12 wherein said hollow tube is further in communication with a supply of heated air.

15. A method for forming a transversely curved slat for use in a covering for an architectural opening comprising the steps of:

providing a supply roll of heat deformable flexible fabric material, pulling said fabric material with a first driven roller in a downstream direction, providing an elongated heat chamber and a downstream cooling chamber, establishing an elongated static support through said heat chamber and along said cooling station, said static support being of arcuate transverse cross section, pulling said fabric material through said heat chamber and said cooling station with a second driven roller and detecting the tension in said fabric material downstream from said first driven roller and upstream from said heat chamber.

16. The method of claim 15, wherein said heat chamber is provided by establishing a hollow tube through which said support extends and further including the step of establishing a system for heating the interior of the tube.

17. The method of claim 16, further including the step of providing longitudinal rails on said support to confine the strip material therebetween as it is passed through said heat chamber and along said cooling station.

18. The method of claim 17, further including the step of providing a plate in overlying relationship with said fabric material as it is pulled through said heat chamber so that said plate remains in engagement with said fabric material as it is pulled through said heat chamber.

19. The method of claim 15 further including the step of providing fans at said cooling station for blowing air across said strip material.

20. The method of claim 17 further including a pair of rollers between which said strip material passes upon leaving said heat chamber, said rollers having confronting convex and concave surfaces corresponding to the transverse curvature of the support.

21. The method of claim 18 wherein said plate floats on said fabric material.

22. The apparatus of claim 7 wherein said plate floats on said strip material.

* * * * *